(12) United States Patent
Karlsson

(10) Patent No.: US 7,751,847 B2
(45) Date of Patent: Jul. 6, 2010

(54) POWER LINK MARGIN FOR HIGH-SPEED DOWNLINK PACKET ACCESS

(75) Inventor: Patrik Karlsson, Alta (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 452 days.

(21) Appl. No.: 11/721,658

(22) PCT Filed: Dec. 17, 2004

(86) PCT No.: PCT/SE2004/001915

§ 371 (c)(1),
(2), (4) Date: Jun. 13, 2007

(87) PCT Pub. No.: WO2006/065183

PCT Pub. Date: Jun. 22, 2006

(65) Prior Publication Data

US 2008/0102876 A1    May 1, 2008

(51) Int. Cl.
*H04W 52/30*    (2009.01)
*H04W 52/34*    (2009.01)

(52) U.S. Cl. .................................. 455/522; 455/69
(58) Field of Classification Search .................. None
See application file for complete search history.

(56) References Cited

U.S. PATENT DOCUMENTS 7,050,824 B2 * 5/2006 Masseroni et al. ........... 455/522
7,085,559 B2 * 8/2006 Sato et al. ................. 455/422.1

FOREIGN PATENT DOCUMENTS

WO    WO 03107707 A1    12/2003

* cited by examiner

*Primary Examiner*—Philip J Sobutka

(57) ABSTRACT

A radio access network node and method of allocating cell downlink power to a set of channels (e.g., DPCH channels) and to a high-speed shared channel such as a high-speed downlink shared channel (HS-DSCH) or a high-speed shared control channel (HS_SCCH). After allocating part of the cell downlink power to the set of channels, the node allocates only a portion of the remainder of the cell downlink power to the high-speed shared channel. The node reserves a power margin for possible use during a future timeslot of a channel of the set.

8 Claims, 4 Drawing Sheets

POWER LINK MARGIN FOR HIGH-SPEED DOWNLINK PACKET ACCESS

BACKGROUND

1. Field of the Invention

The present invention pertains generally to telecommunications, and particularly to a High Speed Downlink Packet Access (HSDPA) system such as that operated (for example) in a Universal Mobile Telecommunications System (UMTS) terrestrial radio access network (UTRAN).

2. Related Art and Other Considerations

The Universal Mobile Telecommunications System (UMTS) is a third generation mobile communication system, which evolved from the Global System for Mobile Communications (GSM), and is intended to provide improved mobile communication services based Wideband Code Division Multiple Access (WCDMA) access technology. As wireless Internet services have become popular, various services require higher data rates and higher capacity. Although UMTS has been designed to support multi-media wireless services, the maximum data rate is not enough to satisfy the required quality of services. In a forum known as the Third Generation Partnership Project (3GPP), telecommunications suppliers propose and agree upon standards for third generation networks and UTRAN specifically, and investigate enhanced data rate and radio capacity.

One result of the forum's work is the High Speed Downlink Packet Access (HSDPA). The HSDPA system is provides, e.g., a maximum data rate of 10 Mbps and to improve the radio capacity in the downlink. FIG. 5 illustrates a high-speed shared channel concept where multiple users 1, 2, and 3 provide data to a high speed channel (HSC) controller that functions as a high speed scheduler by multiplexing user information for transmission over the entire HS-DSCH bandwidth in time-multiplexed intervals (called transmission time intervals (TTI)). For example, during the first time interval shown in FIG. 5, user 3 transmits over the HS-DSCH and may use all of the bandwidth allotted to the HS-DSCH. During the next time interval, user 1 transmits over the HS-DSCH, the next time interval user 2 transmits, the next time interval user 1 transmits, and so forth.

HSDPA achieves higher data speeds by shifting some of the radio resource coordination and management responsibilities to the base station from the radio network controller. Those responsibilities include one or more of the following (each briefly described below): shared channel transmission, higher order modulation, link adaptation, radio channel dependent scheduling, and hybrid-ARQ with soft combining.

In shared channel transmission, radio resources, like spreading code space and transmission power in the case of CDMA-based transmission, are shared between users using time multiplexing. A high speed-downlink shared channel is one example of shared channel transmission. One significant benefit of shared channel transmission is more efficient utilization of available code resources as compared to dedicated channels. Higher data rates may also be attained using higher order modulation, which is more bandwidth efficient than lower order modulation, when channel conditions are favorable.

Radio channel conditions experienced on different communication links typically vary significantly, both in time and between different positions in the cell. In traditional CDMA systems, power control compensates for differences in variations in instantaneous radio channel conditions. With this type of power control, a larger part of the total available cell power may be allocated to communication links with bad channel conditions to ensure quality of service to all communication links. But radio resources are more efficiently utilized when allocated to communication links with good channel conditions. For services that do not require a specific data rate, such as many best effort services, rate control or adjustment can be used to ensure there is sufficient energy received per information bit for all communication links as an alternative to power control. By adjusting the channel coding rate and/or adjusting the modulation scheme, the data rate can be adjusted to compensate for variations and differences in instantaneous channel conditions.

For maximum cell throughput, radio resources may be scheduled to the communication link having the best instantaneous channel condition. Rapid channel dependent scheduling performed at the bases station allows for very high data rates at each scheduling instance and thus maximizes overall system throughput. Hybrid ARQ with soft combining increases the effective received signal-to-interference ratio for each transmission and thus increases the probability for correct decoding of retransmissions compared to conventional ARQ. Greater efficiency in ARQ increases the effective throughput over a shared channel.

With HSDPA, the physical layer becomes more complex as an additional MAC protocol is introduced: the MAC-hs. On the network side, the MAC-hs protocol is implemented in the radio base station (RBS). The MAC-hs protocol contains the retransmission protocol, link adaptation, and channel dependent scheduling. The complexity increase with HSDPA is thus mainly related to the introduction of an intelligent Layer 2 protocol in the radio base station (RBS).

HSDPA generally has an algorithm for selecting the amount of power for the HS-DSCH and a downlink control channel known as the HS-SCCH. The HS-SCCH contains information which is sent to the mobile terminals so that the mobile terminals know if they have data to receive on the HS-PDSCh channel or not.

The most straightforward power algorithm or solution is to allocate, at every transmission time interval (TTI) of the high-speed shared channel, all unused downlink cell power to the HS-SCCH and HS-DSCH channels and to keep the power constant for the high-speed shared channel throughout the TTI after allocation. But such allocation of all unused downlink cell power can be problematic, as illustrated by the situation shown in FIG. 6. FIG. 6 shows a series of transmission time intervals ($TTI_0$ . . . ) for the high-speed downlink shared channel (HS-DSCH), as well as a series of timeslots (TS) for a normal downlink dedicated physical channel (DPCH). The downlink dedicated physical channel (DPCH) carries both the Dedicated Physical Data Channel (DPDCH) and the Dedicated Physical Control Channel (DPCCH).

For convenience, a power graph is superimposed on the series of DPCH timeslots of FIG. 6, showing the total downlink (DL) cell power, and each DPCH timeslot appears in bargraph-like depiction showing the amount of power needed for each DPCH timeslot. In particular, the power needed for each of the first two DPCH timeslots is shown as cross-hatched. The remaining DL power allocated to the $TTI_0$ of the high-speed downlink shared channel (HS-DSCH), after allocating for DPCH timeslot $TS_0$, is shown as a dotted superposition on the DPCH timeslots. So, at the beginning of the time shown in FIG. 6, the power for the $TTI_0$ of the high-speed downlink shared channel (HS-DSCH) is shown as the difference between the total DL cell power and the amount allocated for other channels, i.e., the DPCH. The problem is that the power for the HS-DSCH needs to be constant during its 2 millisecond TTI, while on the other hand the normal DPCH channels are power controlled (e.g., have power allotted to them) every timeslot (0.67 ms). Therefore there is a risk that after all remaining power has been allocated to the HS-DSCH, for its next timeslot the sum or all of the DPCH channels will need more power i.e. the sum of the requested power becomes larger than needed. For example, FIG. 6 illustrates that the second timeslot $TS_1$ of the DPCH requires greater power than the first DPCH timeslot $TS_0$. But since the ongoing $TTI_0$ of the high-speed downlink shared channel (HS-DSCH) is still allocated the same power level as coexisted at DPCH timeslot $TS_0$, the summed power requirements for both DPCH and high-speed downlink shared channel (HS-DSCH) exceed the total DL power capability for the cell.

As a result of a predicament such as that illustrated by way of example in FIG. 6, the radio base station (RBS) in charge of the cell has to make some connections unsatisfied by not giving them the power they need to keep the downlink quality. This will either impact the quality on ongoing DPCH connections e.g. speech or the quality of the HS-DSCH transmission, which can result in a failed transmission, which then need a re-transmission (equal to lower throughput).

What is needed, therefore, and an object herein provided, are means, methods, and techniques for effectively powering a high-speed downlink shared channel (HS-DSCH) with less likelihood of insufficiently funding power allocation for other channels.

SUMMARY

A radio access network node allocates cell downlink power to a set of channels (e.g., DPCH channels) and to a high-speed shared channel. The node does not, after allocating power for the set of channels, allocate the entirety of a remainder of the cell downlink power to the high-speed shared channel. Rather, the node reserves a margin amount of a remainder of the cell downlink power for possible use during a future timeslot of a channel of the set. A marginalized remainder of the cell downlink power (the remainder of the cell downlink power less the margin amount) is allocated to the high-speed shared channel. The node determines the remainder of the cell downlink power by subtracting power requirements during an existing timeslot for the set of channels from total cell downlink power. The high-speed shared channel for which the power allocation can be made can be either the high-speed downlink shared channel (HS-DSCH) or the high-speed shared control channel (HS-SCCH).

Thus, a power margin is employed relative the downlink cell power capability in the HSDPA power allocation for the HS-SCCH and HS-DSCH. There is thus less negative quality impact on the DPCH traffic (integrity) and improved HSDPA transmission success, i.e. lower need for data re-transmission and thereby improved end-user and cell throughput.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail. Moreover, individual blocks are shown in the figures. Those skilled in the art will appreciate that the functions of those blocks may be implemented using individual hardware circuits, using software programs and data in conjunction with a suitably programmed digital microprocessor or general purpose computer, using application specific circuitry (ASIC), and/or using one or more digital signal processors (DSPs).

Figure 1:
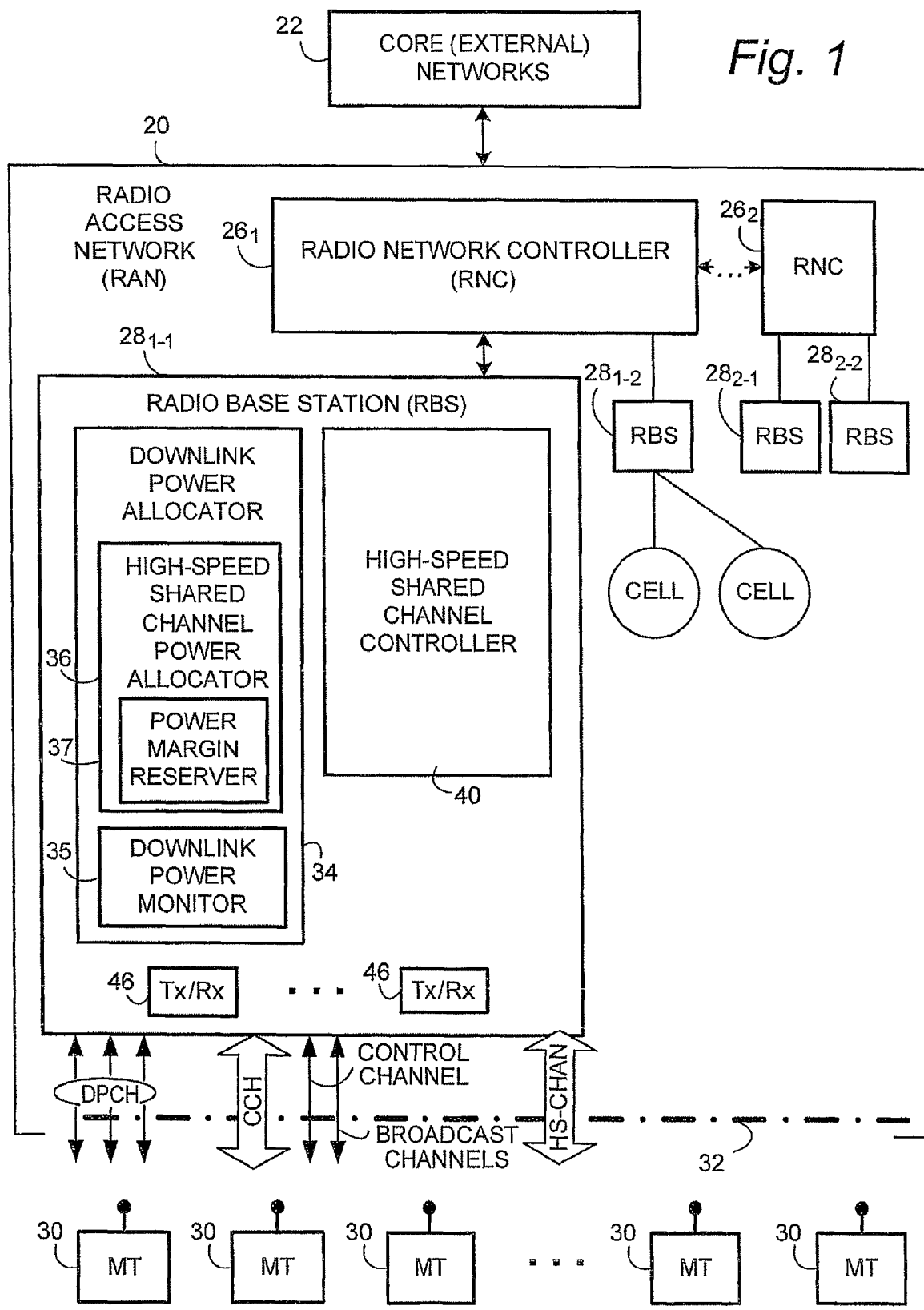
FIG. 1 is schematic view of example mobile communications system in which a power margin reserver for a high-speed shared channel power allocator may be advantageously employed.

FIG. 1 illustrates an example, non-limiting telecommunications system wherein a radio access network 20 is connected to one or more external (e.g., core) networks 22. The external networks 22 may comprise, for example, connection-oriented networks such as the Public Switched Telephone Network (PSTN) and/or the Integrated Services Digital Network (ISDN), and/or connectionless external core network such as (for example) the Internet. One or more of the external networks have unillustrated serving nodes such as, e.g., a Mobile Switching Center (MSC) node and a General Packet Radio Service (GPRS) Service (SGSN) node working in conjunction with a gateway GRPS support node (GGSN).

Each of the core network service nodes connects to the radio access network (RAN) 20 over a suitable interface. In the particular, non-limiting example shown in FIG. 1, the radio access network (RAN) 20 is a UMTS Terrestrial Radio Access Network (UTRAN) and the interface with the external network is over the Iu interface. The radio access network (RAN) 20 includes one or more radio network controllers (RNCs) 26 and one or more radio base stations (RBS) 28. For sake of simplicity, the radio access network (RAN) 20 of FIG. 1 is shown with only two RNC nodes, particularly $RNC\ 26_1$ and $RNC\ 26_2$. Each RNC 26 is connected to one or more base stations (BS) 28. For example, and again for sake of simplicity, two base station nodes are shown connected to each RNC 26. In this regard, $RNC\ 26_1$ serves base station $28_{1-1}$ and base station $28_{1-2}$, while $RNC\ 26_2$ serves base station $28_{2-1}$ and base station $28_{2-2}$. It will be appreciated that a different number of base stations can be served by each RNC, and that RNCs need not serve the same number of base stations. Moreover, FIG. 1 shows that an RNC can be connected over an Iur interface to one or more other RNCs in the UTRAN 24. Further, those skilled in the art will also appreciate that a base station is sometimes also referred to in the art as a radio base station, a node B, or B-node.

It should be understood that at least one and likely more of the RNCs of the radio access network have an interface to one or more core networks. Further, in order to support continuation of established connections when the UE is moving between cells controlled by different RNCs in the Radio Access Network, a Signalling Network (e.g. Signalling System No 7) enables RNCs to perform the required RNC-RNC signalling.

In the illustrated embodiments, for sake of simplicity each base station 28 is shown as serving one cell. For base station $28_{1-2}$, for example, the cells are represented by a circle. It will be appreciated by those skilled in the art, however, that a base station may serve for communicating across the air interface for more than one cell. For example, two cells may utilize resources situated at the same base station site. Moreover, each cell may be divided into one or more sectors, with each sector having one or more cell/carriers.

As shown in FIG. 1, mobile terminals (MT) 30 communicates with one or more cells or one or more base stations (BS) 28 over a radio or air interface 32. In differing implementations, the mobile terminals (MT) 30 can be known by different names, such as wireless terminal, mobile station or MS, user equipment unit, handset, or remote unit, for example. Each mobile terminal (MT) may be any of myriad devices or appliances, such as mobile phones, mobile laptops, pagers, personal digital assistants or other comparable mobile devices, SIP phones, stationary computers and laptops equipped with a real-time application, such as Microsoft netmeeting, Push-to-talk client etc. Preferably, at least for a UTRAN implementation of the radio access network (RAN) 20, radio access is based upon Wideband, Code Division Multiple Access (WCDMA) with individual radio channels allocated using CDMA spreading codes. Of course, other access methods may be employed.

FIG. 1 further illustrates in simplified form that different types of channels may exist between one of the base stations 28 and mobile terminals (MT) 30 for transport of control and user data across a radio or air interface 32. For example, in the forward or downlink direction, there are several types of broadcast channels, one or more control channels, one or more common traffic channels (CCH), dedicated traffic channels (DPCH), and a high-speed shared channel which now is of particular interest. The high-speed shared channel (HS-channel) may be a high-speed downlink shared channel (HS-DSCH) or a high-speed shared control channel (HS-SCCH). The high-speed downlink shared channel (HS-DSCH) and the high-speed shared control channel (HS-SCCH) are separate channels. As understood by those skilled in the art, the signaling carried by the high-speed shared control channel (HS-SCCH) is performed by transmitting the HS-SCCH TTI two slots in advance of the corresponding HS-DSCH TTI.

The RNC 26 configures the cell to support HSDPA. Thereafter it is up to the RBS 28 to allocate power and the amount of codes needed at respective TTI transmissions.

The radio base station (RBS) 28 comprises a downlink power allocator 34 which serves to allocate downlink power to each of the downlink channels. Either separate or comprising is a downlink power monitor 35 which keeps track of the total amount of downlink power allocated at any given moment. A sub-functionality or sub-unit of downlink power allocator 34 is high speed shared channel power allocator 36, which is charged specifically with the responsibility for determining the downlink power allocation for the high-speed shared channel, i.e., high-speed downlink shared channel (HS-DSCH) and/or high-speed shared control channel (HS-SCCH). Included in high speed shared channel power allocator 36 is power margin reserver 37. The downlink power allocator 34 with its high speed shared channel power allocator 36 and power margin reserver 37 may be implemented using individual hardware circuits, using software programs and data in conjunction with one or more suitably programmed digital microprocessors or general purpose computers, using application specific circuitry (ASIC), and/or using one or more digital signal processors (DSPs).

Figure 2:
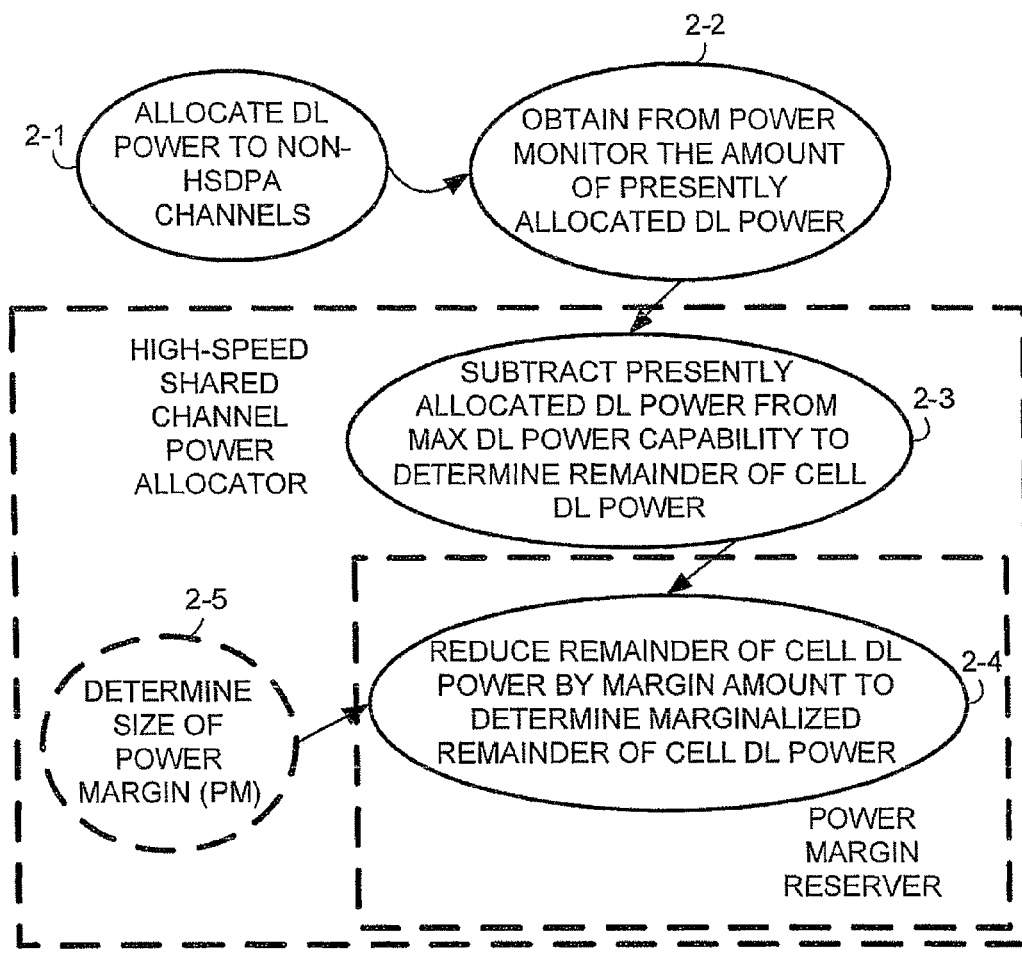
FIG. 2 is a state diagram showing various representative, basic states, steps, or events performed in determining a power allocation for a high-speed shared channel.

Using its downlink power allocator 34, and its high speed shared channel power allocator 36 in particular, radio base station (RBS) 28 allocates cell downlink power to a set of channels (e.g., DPCH channels) and to a high-speed shared channel. Basic example steps or events of operation of downlink power allocator 34 and its subunits/subfunctions are illustrated in FIG. 2. As event 2-1, downlink power allocator 34 allocates, as appropriate, the power requested by any requesting channels of the set of non-HSDPA channels (e.g., DPCH channels). At any given time, as reflected by event 2-2, downlink power allocator 34 knows, by obtaining from downlink power monitor 35, the amount of presently allocated downlink power. As event 2-3, the high speed shared channel power allocator 36 determines the remainder of cell downlink power by subtracting the presently allocated downlink power from the maximum downlink power capability of the cell. Then, as event 2-4, the power margin reserver 37 reduces the remainder of cell downlink power by a margin amount in order to arrive at or determine a marginalized remainder of cell downlink power for use by the high-speed shared channel.

As an optional event depicted as event 2-5 in FIG. 2, the high speed shared channel power allocator 36 or other functionality can set or determine the amount of size of the power margin (PM). The amount or size (in decibels) of the power margin (PM) can be set or determined in various ways, and can be a configurable parameter. The size of the power margin (PM) can be selected to depend on performance results. The size of the power margin (PM) can be determined dynamically such as (for example) a predetermined percentage of remaining cell downlink power or of downlink power allocated to the DPCHs. Alternatively, rather than being dynamically determined, the power margin (PM) amount could be static (e.g., an absolute values in watts) and may be set, for example, as a predetermined percentage of maximum cell downlink power capability.

Figure 3:
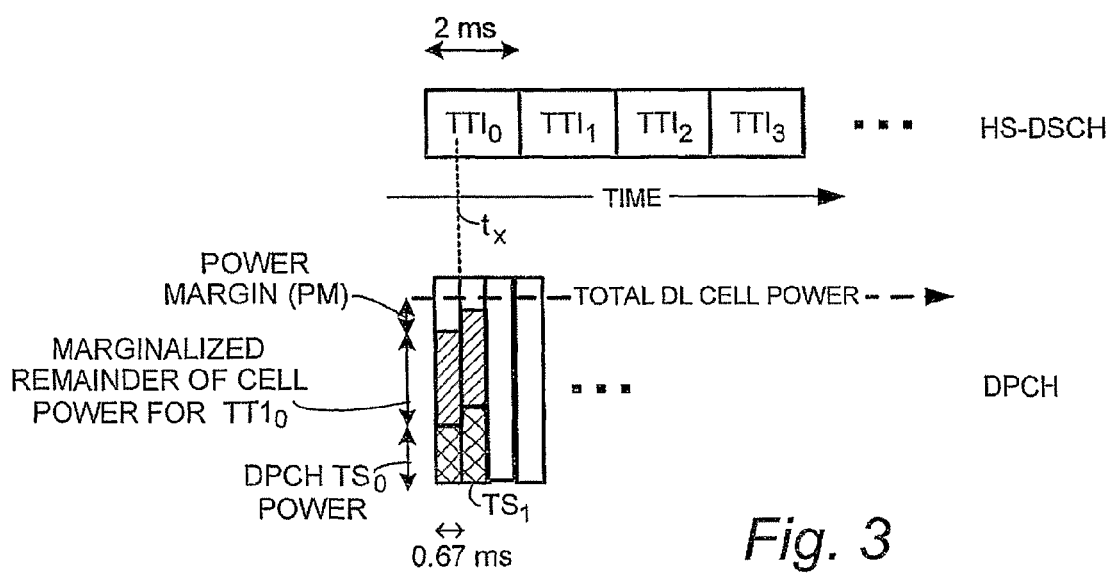
FIG. 3 is a diagrammatic view illustrating a power margin solution for allocation of power to a high-speed shared channel.

Unlike conventional proposals, downlink power allocator 34 does not, after allocating power for the set of (non-high speed, non-shared) channels, allocate the entirety of the remainder of the cell downlink power to the high-speed shared channel. Rather, as shown in FIG. 3, using its power margin reserver 37, high speed shared channel power allocator 36 reserves a power margin (PM) amount of a remainder of the cell downlink power for possible use during a future timeslot of a channel of the set (e.g., of a channel which is not a high-speed shared channel). Thus, the marginalized remainder of the cell downlink power (the remainder of the cell downlink power less the power margin (PM) amount) is allocated to the high-speed shared channel. Therefore, should a non-HSDPA channel require more power at a time when the power allocated to the HSDPA channel must remain constant, there is more likelihood that the maximum power capabilities of the cell will not be exceeded, as shown in FIG. 3. Thus, a power margin (PM) is employed relative the downlink cell power capability in the HSDPA power allocation for the HS-SCCH and HS-DSCH. There is thus less negative quality impact on the DPCH traffic (integrity) and improved HSDPA transmission success, i.e. lower need for data re-transmission and thereby improved end-user and cell throughput.

As evident from the foregoing, the power margin reserver 37 provides power headroom for the DPCH power variation during the TTI, and thus tends to lessen the problem situation in which a subsequent downlink power request might exceed the total power possible for the RBS to provide. It should be understood that the functions performed above need not be delegated or carried out by functionalities or structures (e.g., units) comparably named or by any particular hierarchy of functionalities or architecture, so long as the power margin (PM) is utilized in determining the power allocated to the high-speed shared channel.

Base stations provided with high-speed downlink packet access capability have a high-speed shared channel controller (HSDPA controller) 40 or similar channel manager that governs allocation and utilization of the high-speed shared channel. HSDPA controller 40 can also be referred to as the HSDPA scheduler. The high-speed shared channel controller 40 governs setup and operation of both the high-speed downlink shared channel (HS-DSCH) and the high-speed shared control channel (HS-SCCH).

The high-speed shared channel controller 40 may be included with or separate from a node controller or the like which bears responsibility for overall node operation/coordination. Further, the high-speed shared channel controller 40 may be implemented using individual hardware circuits, using software programs and data in conjunction with one or more suitably programmed digital microprocessors or general purpose computers, using application specific circuitry (ASIC), and/or using one or more digital signal processors (DSPs).

Figure 4:
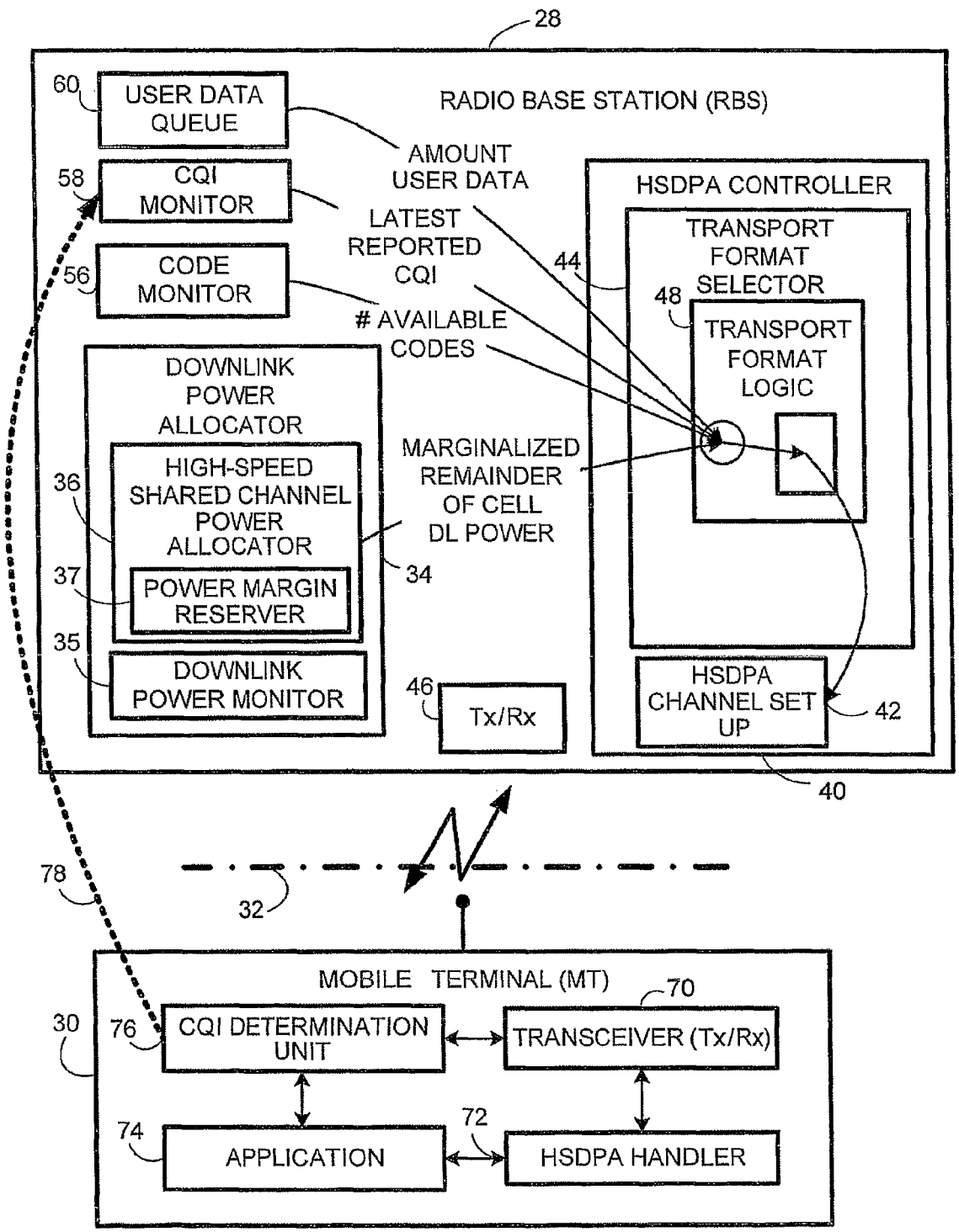
FIG. 4 is schematic view of a mobile terminal and of a network node which employs an example embodiment power margin reserver for a high-speed downlink shared channel (HS-DSCH).

The high-speed shared channel controller 40 includes shared channel setup unit 42 (FIG. 4). The shared channel setup unit 42 bears responsibility for coordinating setup of the high-speed shared channel.

FIG. 4 shows how the downlink power allocator 34 (with its high speed shared channel power allocator 36 and power margin reserver 37) interacts with a high-speed shared channel controller 40 which controls a high-speed downlink shared channel (HS-DSCH). Thus, the discussion of FIG. 4 is essentially confined to high-speed downlink shared channel (HS-DSCH). In terms of handling the high-speed downlink shared channel (HS-DSCH), the HSDPA controller 40 of the example embodiment includes transport format selector 44. The transport format selector 44 in turn includes transport format logic 48 which, in manner already known by those familiar with high-speed downlink packet access technology, utilizes various input parameters to lookup, map, calculate, or otherwise obtain a transport format which is dependent upon those input parameters.

For the high-speed downlink shared channel (HS-DSCH), the setup unit 42 obtains (from transport format selector 44) an appropriate format size for each time interval of the high-speed downlink shared channel (HS-DSCH), and coordinates with one of the transceivers (Rx/Tx) 46 of radio base station (RBS) 28 for actual transmission of the high-speed downlink shared channel (HS-DSCH) using the power allocated to the high-speed downlink shared channel (HS-DSCH).

FIG. 4 further shows various other constituent elements and/or functionalities of an example radio base station (RBS) 28 and an example mobile terminal (MT) 30. For sake of simplicity, FIG. 4 shows only one of the possible plural transceivers (Rx/Tx) 46 for radio base station (RBS) 28, i.e., the particular transceiver which will be utilized for the high-speed downlink shared channel (HS-DSCH). FIG. 4 also shows the HSDPA controller 40 with its HSDPA setup unit 42 and transport format selector 44. In addition, FIG. 4 shows radio base station (RBS) 28 as further comprising various monitors, such as code monitor 56 and CQI (channel quality indicator) monitor 58.

Yet further, the radio base station (RBS) 28 of FIG. 4 includes a user data queue 60 through which user data passes when applied to high-speed downlink shared channel (HS-DSCH). By monitoring user data queue 60, the radio base station (RBS) 28 of FIG. 4 knows how much data a user has in user data queue 60, so that the amount of user data in user data queue 60 can be communicated to transport format selector 44 as shown in FIG. 2.

The mobile terminal (MT) 30 of FIG. 4 includes, among its other numerous unillustrated components and functionalities, the following: MT transceiver 70; HSDPA handler 72 (which handles the HS-DSCH and monitors the HS-SCCH); HS-DSCH application 74; and CQI determination unit 76, all of which perform in a manner understood by the person skilled in the art. The user data received over the air interface by MT transceiver 70 on the high-speed downlink shared channel (HS-DSCH) may be utilized by the HS-DSCH application 74.

As illustrated by broken line arrow 78, each mobile terminal (MT) 30 via its CQI determination unit 76 periodically reports a channel quality indicator value to CQI monitor 58 of radio base station (RBS) 28. Specifically, each mobile terminal (MT) monitors the experienced downlink quality on the common pilot channel CPICH, and then transforms that to a DL CQI indicator which it reports up to the RBS. Although not explicitly shown as such in FIG. 2, in an example UTRAN implementation the channel quality indicator is signaled as an information element on the physical uplink channel HS-PD-CCH by MT transceiver 70. The frequency of the reporting of the CQI is determined by parameters sent to the mobile terminal (MT) by the radio access network, and is generally in the range of 20-200 milliseconds. The channel quality indicator is received over air interface 32 by the appropriate transceiver (Rx/Tx) 46 in radio base station (RBS) 28, and the CQI value is transmitted to CQI monitor 58. Thus, the CQI monitor 58 keeps track, e.g., of the latest reported CQI from each mobile terminal 30.

The code monitor 56 knows the unused amount of spreading codes (e.g., radio resources in CDMA systems), and reports the number of unused codes (i.e., available codes) to transport format selector 44. Since the RBS 28 needs to know which exact codes is allocated to each physical channel of the cell (received from the RNC), the RBS 28 has full knowledge of the exact codes in the code tree are allocated and which are not. Depending on the specific implementation, the RNC 26 can send down to the RBS 28 which exact codes shall be used for HS-PDSCH, or alternatively the code assignments can be totally left to the RBS 28.

Figure 5:
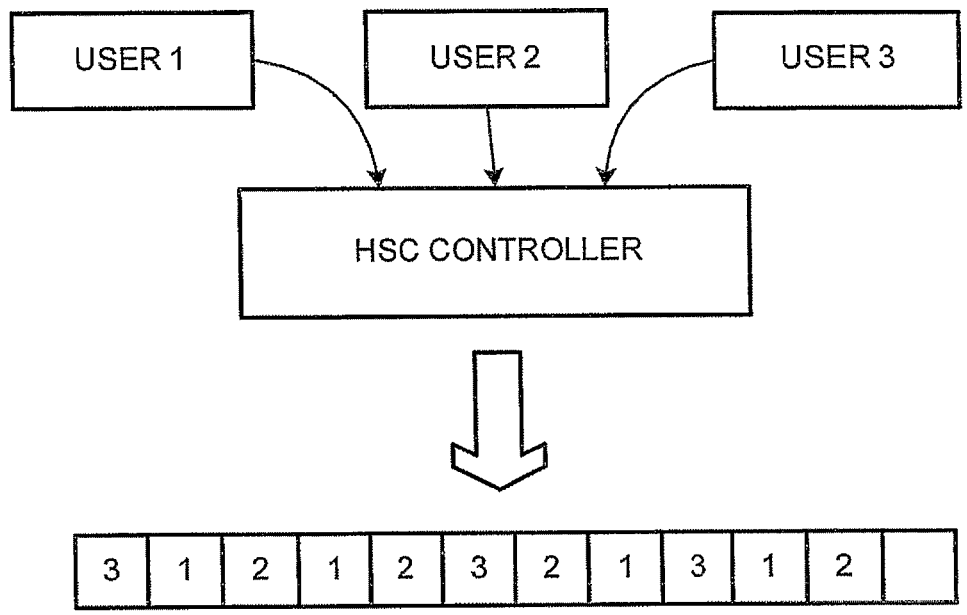
FIG. 5 is a diagrammatic view of a high-speed shared channel concept.
Figure 6:
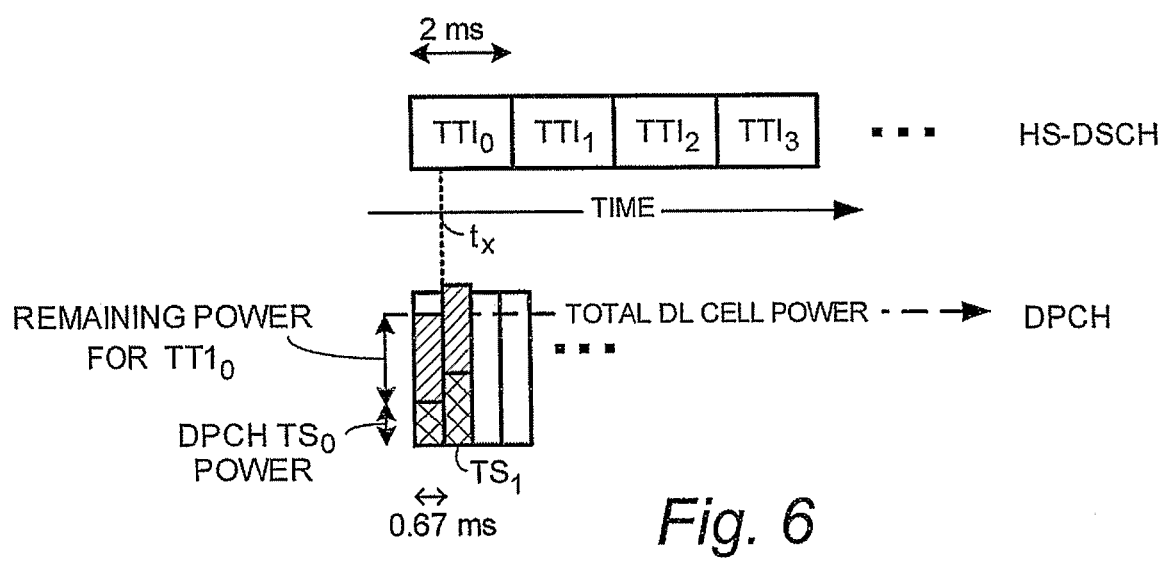
FIG. 6 is a diagrammatic view illustrating a problematic allocation of power to a high-speed shared channel.

The HSDPA controller 40 determines the transport format for each transmission time interval (TTI), making such determination on the order of every 2 milliseconds. When determining what transport format to utilize when transmitting for a particular user in the particular user's time interval or TTI (see FIG. 5), the transport format selector 44 uses the plural input parameters illustrated in FIG. 4 (the latest reported CQI; the marginalized remainder of cell DL power; the available number of HS-DSCH codes; and the amount of data this user has available for transmission) as factors for determining the transport format for this user for this interval (TTI) on the high-speed downlink shared channel (HS-DSCH). Thus, the marginalized remainder of cell DL power output by downlink power allocator 34 and by high speed shared channel power allocator 36 in particular is a factor in determining the transport format (e.g., energy per bit of user data) for a TTI of the high-speed downlink shared channel (HS-DSCH).

While FIG. 4 specifically pertains to the HS-DSCH, it should be appreciated that the HS-SCCH can either be transmitted at a fixed power, or at a power which is set dynamically in similar manner.

Thus, as explained above, the downlink power allocator 34 allocates power for the HS-DSCH and HS-SCCH in an optimal way. The downlink power allocator 34 does not allocate all remaining unused downlink cell power, but rather introduces a steer able power margin (PM).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A downlink power allocator in a radio access network node for allocating cell downlink power between a high-speed shared channel and other downlink shared channels, said power allocator comprising:
   means for determining a total maximum cell downlink power;
   means for allocating a first portion of the total maximum cell downlink power to the other downlink shared channels over an existing time slot of a transmission time interval;
   means for dividing a remainder of the total maximum cell downlink power between the high-speed shared channel and a reserved margin amount of downlink power;
   means for determining whether at least one of the other downlink shared channels requires additional downlink power during a future timeslot of the transmission time interval; and
   means responsive to a determination that at least one of the other downlink shared channels requires additional downlink power, for allocating the reserved margin amount of downlink power to the at least one other downlink shared channel.

2. The power allocator as recited in claim 1, wherein the dividing means determines the reserved margin amount as a predetermined percentage of the maximum cell downlink power.

3. The power allocator as recited in claim 1, wherein the high-speed shared channel is a high-speed downlink shared channel (HS-DSCH).

4. The power allocator as recited in claim 1, wherein the high-speed shared channel is a high-speed shared control channel (HS-SCCH).

5. A method in a power allocator for allocating cell downlink power between a high-speed shared channel and other downlink shared channels in a radio access network node, said method comprising the steps of:
   determining a total maximum cell downlink power;
   allocating a first portion of the total maximum cell downlink power to the other downlink shared channels over an existing time slot of a transmission time interval;
   dividing a remainder of the total maximum cell downlink power between the high-speed shared channel and a reserved margin amount of downlink power;
   determining whether at least one of the other downlink shared channels requires additional downlink power during a future timeslot of the transmission time interval; and
   allocating the reserved margin amount of downlink power to the at least one other downlink shared channel in response to a determination that at least one of the other downlink shared channels requires additional downlink power.

6. The method as recited in claim 5, wherein the dividing step includes determining the reserved margin amount as a predetermined percentage of the maximum cell downlink power.

7. The method as recited in claim 5, wherein the high-speed shared channel is a high-speed downlink shared channel (HS-DSCH).

8. The method as recited in claim 5, wherein the high-speed shared channel is a high-speed shared control channel (HS-SCCH).

* * * * *